Patented Aug. 30, 1927.

1,640,680

UNITED STATES PATENT OFFICE.

ALBERT VANDERLAAN, OF LARCHMONT, NEW YORK.

METHOD OF PERPETUATING HUMAN REMAINS AND ARTICLE MADE THEREBY.

No Drawing.   Application filed December 10, 1924. Serial No. 754,975.

This invention relates to the art of perpetuating human remains, and more particularly relates to a method therefor and article made thereby.

The ugliest phase of civilized man's career on earth is not so much his inevitable physical expiration, as the manner in which it became the custom to dispose of his mortal remains by burial in earth. No matter how beautiful modern cemeteries (literally meaning "sleeping places") may have been laid out, the horror of "slow putrefaction" and of "the cold worm that fretteth the enshrouded form" remains. Many disgusting features are connected with interment in the larger cities, and the great mass of sanitary objections are raised against even the most carefully planned cemeteries, where four square yards of surface are allotted to each grave. It is evident that under conditions of interment, the space of time which obliterates all physical trace of one's past life rarely exceeds a hundred years. Look through the historic churchyards and old cathedrals of Europe, crowded with the graves of those who were considered prominent, and note that unless their genius had caused the erection of a national monument, kept in repair at public expense, but very few coats of arms, names or inscriptions will give us a clue to the identity of the buried corpse. Granite and marble slabs under foot are worn smooth and the stones in the churchyards and cemeteries are weathered beyond recognition. The graves of the multitude are generally obliterated within a score of years, the bones dug up and disposed of for a variety of purposes. Cremation helps to correct these indignities and, under ideal conditions, prevents total obliteration. The ashes of the cremated, deposited in cinerary urns of marble, clay or metal, are usually delivered to the nearest relatives or stored in places especially designated for that purpose. Unless an urn should break, or in after years, through its own intrinsic value, arouse cupidity, the ashes will probably be safe.

What I propose is to go a big step forward and by a simple, yet strange to say never practiced process to safeguard the human ashes forever and beyond peradventure of mischance against loss or mutilation.

My method consists of incorporating the ashes integrally in material of a permanent character and molded or otherwise fashioned into an integral object, such as a tile plaque, object of art or, in fact, an object having any arbitrary size, shape and form desired. For instance, the ashes may be mixed with clay in suitable proportions and the mixture molded and fired into suitable forms, which, in addition, if desired, may be covered with colored glazes, thus obtaining further security as well as lasting embellishment. By combining my method with the best available contemporary art, indestructible objects of veneration and beauty will be created which for thousands of years to come will remain intact and historically indicate the progress of civilized man.

What could be more appropriate or decorous than that the ashes of men of genius or enterprise should be placed in the form of a plaque in a part of the works to which they devoted their lives. I have here, for instance, in mind, builders of bridges, tunnels, dams and other large achievements. For the less conspicuous workers equally appropriate places could be designated; those religiously inclined could find a place in their favorite house of worship and the outdoor man's ashes could be placed in the side of a hill or rock overlooking the field of his action. Much productive land which now is set aside for the perpetual preservation of human remains would become available and, in my estimation, a finer sense of reverence would be developed.

Tests have shown that ½ pound of animal ashes will be readily absorbed by a clay tile 6" square by ½" in thickness without in any way affecting the strength or durability of the tile. The weight of animal ashes obtained by cremation is 3% of the live weight, so that the remains of a person weighing 200 pounds would yield 6 pounds of ashes, which could be assimilated in as few as twelve tiles or in a plaque measuring 1' 6" wide by 2' 0" in height. By mixing the ashes in slighter proportions, the size of the plaques could be enlarged to any dimension desired.

It is to be understood that my invention is not limited to the use of clay nor to the formation of plaques. As above stated, it includes the use of any suitable carrying material and the formation of finished articles in any arbitrary shapes, sizes and forms. Accordingly, the scope of the invention is as broad as is indicated in the claims that follow.

It is to be understood that my invention is applicable to the perpetuation and preservation of all animal ashes.

What I claim is:—

1. As an article of manufacture, a memorial object the substance of which consists of a homogeneous mixture of clay material and ashes of the human or animal commemorated, and the object having permanent arbitrary shape.

2. As an article of manufacture, a memorial object consisting of a shaped and baked mixture of clay and ashes of the human or animal commemorated.

3. As an article of manufacture, a memorial object consisting of a shaped, baked, and glazed mixture of clay and ashes of the human or animal commemorated.

4. As an article of manufacture, a memorial object consisting of a shaped and baked mixture of a major amount of clay and a minor amount of ashes of the human or animal commemorated.

5. As an article of manufacture, a memorial object consisting of a shaped and baked mixture of clay and ashes of the human or animal commemorated, the amount of such ashes in the mixture not exceeding one-thirty-sixth of a pound per cubic inch.

6. A method of commemorating the deceased, which consists of integrally intermixing ashes of the deceased to be commemorated with a clay of permanent character, fashioning the mixture into a memorial article of permanent arbitrary form, and giving permanence thereto by baking.

7. A method of commemorating the deceased, which consists of integrally intermixing ashes of the deceased to be commemorated with a clay substance, fashioning the mixture into a memorial article of arbitrary form, giving permanence thereto by baking the formed mixture and glazing the surface.

This specification signed this 3rd day of December, 1924.

ALBERT VANDERLAAN.